UNITED STATES PATENT OFFICE 2,575,225

PREPARATION OF O-ALKYL DICHLORO-THIOPHOSPHATES

Richard H. F. Manske and Marshall Kulka, Guelph, Ontario, Canada, assignors to United States Rubber Company, New York, N. Y., a corporation of New Jersey No Drawing. Application September 29, 1948, Serial No. 51,868

4 Claims. (Cl. 260—461)

This invention relates to thiophosphates and more particularly to an improved method of making O-alkyl dichlorothiophosphates and O-alkyl-O-alkyl-p-nitrophenyl thiophosphates.

O-alkyl-O-alkyl-O-p-nitrophenylthiophosphates and particularly O,O-diethyl-O-p-nitrophenylthiophosphate have attained considerable importance as insecticides. The diethyl compound has been heretofore made by reacting thiophosphoryl chloride with sodium ethylate in ethanol, followed by isolation of the resulting O,O-diethyl chlorothiophosphate and conversion thereof to the desired O,O-diethyl-O-p-nitrophenylthiophosphate. In this process, as heretofore carried out, the intermediate product was isolated from the alcohol solution by pouring the reaction mixture into water. This process has many disadvantages, among which are the low yields of the intermediate and the necessity for the recovery of the alcohol from an aqueous solution.

The preparation of O-alkyl dichlorothiophosphates (III) by heating together an alcohol (II) with thiophosphoryl chloride (I) has been known for a long time (Pistchimuka, J. Russ. Phys. Chem. Soc., 44 1406 (1912) (C. A., 7 987 (1913); Mastin, Norman, and Weilmuenster, J. Am. Chem. Soc., 67 1662 (1945); Booth, Martin, and Kendall, J. Am. Chem. Soc., 70 2523 (1948)). The reaction is as follows:

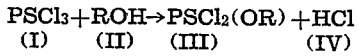
(I)    (II)    (III)      (IV)

The reaction, as heretofore conducted, is accompanied by side reactions so that the yield of the desired intermediate (III) is low. It has been found recently that the yield of (III) is materially increased when the reaction mixture is diluted with benzene, this being the subject matter of the copending application of Richard H. F. Manske et al., Serial Number 39,376, filed July 17, 1948. Thus it was found that when a solution of one mole of (I), 2 moles of (II) and one liter of benzene was heated under reflux for five hours yields of (III) of the order of 70 per cent or more were obtained. Furthermore, the benzene recovered from the reaction mixture when used in subsequent runs together with 1 mole of fresh (I) and one and one-quarter mole of fresh (II) gave yields of (III) of the order of 80 to 85 per cent, this increase in yield now being attributed to the fact that the reaction in the initial run is incomplete so that unreacted alcohol and thiophosphoryl compounds lower-boiling than the desired PSCl₂(OR), particularly unreacted thiophosphoryl chloride, together with some PSCl₂(OR) distill over with the benzene and these add materially to the yields obtained in subsequent runs.

We have now discovered that the intermediate compound having the general formula

where R is a lower alkyl group, may be made in a manner offering many advantages over prior art processes by effecting the reaction between thiophosphoryl chloride and the lower alkanol in the presence of a halogenated aliphatic hydrocarbon having a boiling point of from 30° to 65° C. as a solvent for the reactants. Tertiary butyl chloride is the preferred solvent for use in our invention.

Our invention, in a more specific aspect, further comprises isolating the aforesaid intermediate, PSCl₂(OR), from the resulting reaction mixture and converting it to O-alkyl-O-alkyl-O-p-nitrophenylthiophosphate in a manner fully disclosed hereinafter.

In the preferred practice of our invention we reflux the reaction mixture consisting of the thiophosphoryl chloride, the lower alkanol and the halogenated aliphatic hydrocarbon solvent until the reaction has proceeded to the extent desired, usually for several hours, say from 4 to 12 hours, whereupon we isolate the above intermediate compound (PSCl₂(OR)) from the resulting reaction mixture in any suitable manner and subsequently convert it to the desired O-alkyl-O-alkyl-O-p-nitrophenylthiophosphate by reacting the isolated PSCl₂(OR) with an alkali metal alcoholate of a lower alkanol in solution in a lower alkanol to form PSCl(OR)(OR₁) where R₁ is the alkyl group of the alkali metal alcoholate, commingling the resulting mixture directly (without separation of the second intermediate) with an alkali metal p-nitrophenolate, and reacting the alkali metal p-nitrophenolate with the PSCl(OR)(OR₁) to form the desired product.

Any halogenated aliphatic hydrocarbon having a boiling point of from 30° to 65° C. may be employed in the practice of our invention. The halogen contained in the halogenated hydrocarbon generally will be chlorine, since the chlorinated hydrocarbons are most economical. However, instead of chlorine it may be bromine or iodine or even fluorine. Generally we employ the halogenated aliphatic hydrocarbons which are saturated after halogenation (i. e., which are free from double or triple bonds). However, we may employ halogenated aliphatic hydrocarbons which contain a double bond, examples of such compounds being the dichloroethenes. The following table lists typical halogenated aliphatic hydrocarbons suitable for use in carrying out the present invention:

| Halogenated Aliphatic Hydrocarbon | B. P., °C. |
|---|---|
| Tertiary Butyl Chloride | 51- 2 |
| Chloroform | 61.2 |
| Methylene Dichloride | 39.8 |
| Ethyl Bromide | 38- 9 |
| Methyl Iodide | 42.6 |
| n-Propyl Chloride | 46.4 |
| Isopropyl Chloride | 36.5 |
| Isopropyl Bromide | 60 |
| 1,1-Dichloroethene | 37 |
| 1,2-Dichloroethene (cis) | 60 |
| 1,2-Dichloroethene (trans) | 48 |

We have discovered that many advantages are obtained by carrying out the reaction between the thiophosphoryl chloride and the lower alkanol in solution in a halogenated aliphatic hydrocarbon having a boiling point between 30° and 65° C. Among these advantages are a considerable increase in yield of the first intermediate $PSCl_2(OR)$ often to a figure of the order of 75% to 90% (based on thiophosphoryl chloride) and a minimizing of side reactions. The solvents used in the instant invention also present numerous advantages over benzene which is described as a solvent in the copending application mentioned above. Most important of the advantages over benzene is that the solvents of the present invention enable optimum results to be obtained with considerably less alcohol in the first step of the synthesis. Thus with tertiary butyl chloride as the solvent best results are obtained using 1.5 moles of alcohol per mole of thiophosphoryl chloride in the initial run and 1.1 moles of fresh alcohol in subsequent runs as compared to 2 moles of alcohol in the initial run and 1.25 moles of fresh alcohol in subsequent runs required for best results when benzene is used as the solvent. The use of the solvents of the instant invention enable a higher productivity to be obtained since less alcohol is required and since less solvent is required. Thus the halogenated hydrocarbon solvents may be employed in an amount corresponding to 400 cc. per mole (gram molecular weight) of thiophosphoryl chloride as compared to benzene which gives optimum results at a dilution of 1,000 cc. of benzene per mole of thiophosphoryl chloride. Another advantage of the solvents of the present invention is that they boil substantially below benzene so that the reaction takes place at a substantially lower temperature.

We much prefer to use tertiary butyl chloride as the solvent in the reaction between thiophosphoryl chloride and the lower alkanol to give the first intermediate. The use of tertiary butyl chloride is preferred not only because its boiling point seems to be the optimum temperature for this reaction but also because isobutylene gas may be passed into the reaction mixture and caused to react with the hydrogen chloride as it is formed by the reaction and form more tertiary butyl chloride. In this way the hydrogen chloride may be removed from the reaction mixture thereby favorably displacing the chemical equilibrium. Isobutylene and hydrogen chloride exhibit the unusual characteristic that even under completely anhydrous conditions they combine irreversibly substantially instantaneously upon contact to form tertiary butyl chloride.

Temperature seems to be critical in the reaction by which the first intermediate is prepared. The boiling point of tertiary butyl chloride seems to be the optimum. Comparing the yields of 66, 72, 76 and 82% of $PSCl_2OC_2H_5$ obtained under comparative conditions from reaction mixtures of $PSCl_3$, 1 mole, and ethanol, 1.5 moles, using 400 cc. of benzene, chloroform, methylene dichloride and t-butyl chloride, respectively, as solvents, it will be noted that the yield does not increase uniformly with the boiling point of the solvent.

In the most highly preferred practice of our invention, the first reaction is carried out in the presence of tertiary butyl chloride and in the presence of isobutylene in amount at least sufficient to combine with all of the hydrogen chloride formed by the reaction so that any hydrogen chloride liberated is immediately reacted and removed from the reaction mixture. This gives still higher yields of the first intermediate $PSCl_2(OR)$. The entire amount of isobutylene could conceivably be introduced at the outset. However, we prefer to add it gradually during the course of the reaction, either portionwise or continuously, at such a rate and in such manner that there is always present in the reaction mixture at least that amount of isobutylene which is molecularly equivalent to the hydrogen chloride liberated by the reaction. Still more preferably, we introduce the isobutylene at a rate such that there is present at all times during the course of the reaction a substantial excess of isobutylene over the equivalent of hydrogen chloride liberated. We often prefer to introduce at least 2 moles of isobutylene per mole of thiophosphoryl chloride taken since this provides a factor of safety insuring against the presence of any substantial amount of hydrogen chloride in the reaction mixture for any appreciable length of time.

In carrying out the first step of our process we almost invariably reflux the reaction mixture at atmospheric pressure; although slightly superatmospheric pressure might conceivably be used, its use would not be practical since it would require use of pressure-resisting reactors.

When the first step of our invention is carried out in the absence of isobutylene, the reaction is conducted in such manner that the bye-product hydrogen chloride is allowed to escape. This result is easily achieved with the ordinary reflux technique in accordance with which the hydrogen chloride passes through the reflux condenser in uncondensed form.

Other advantages of using tertiary butyl chloride as the solvent with introduction of isobutylene during the reaction as described above are that it is easier to separate the unreacted thiophosphoryl chloride and the first intermediate, $PSCl_2(OR)$, from tertiary butyl chloride, and that bye-product hydrogen chloride formed by the reaction is utilized in the preparation of the required solvent so that when the reaction is conducted with recycling of the tertiary butyl chloride recovered from the first reaction mixture for re-use in subsequent runs it is not necessary to add any fresh tertiary butyl chloride to the system since the reaction between the hydrogen chloride formed and the isobutylene introduced forms additional tertiary butyl chloride in an amount such as to more than make up for system losses of tertiary butyl chloride. Thus the only tertiary butyl chloride which needs to be introduced is that required to initiate the first run.

The following table gives typical results obtained in the preparation of O-ethyl dichlorothiophosphate from one mole (i. e., one gram molecular weight, 169.5 g.) of thiophosphoryl chloride using tertiary butyl chloride as the solvent.

| Run | PSCl$_2$OC$_2$H$_5$ Prepared from PSCl$_3$ (one mole) | | | | | Residue |
|---|---|---|---|---|---|---|
|  | Ethanol moles | t-butyl chloride cc. | Reflux, hrs. | Yield Per cent of PSCl$_2$OC$_2$H$_5$ | Unchanged PSCl$_3$ recovered, g. | |
| 1 | 2 | 1,000 | 8 | 82 | -------- | 16 |
| 2 | 2 | 1,000 | 5 | 75 | 10 | 14 |
| 3 | 1.25 | 1,000 | 8 | 59 | 50 | 6 |
| 4 | 1.25 | 500 | 8 | 80 | 10 | 10 |
| 5 | 1.25 | 375 | 7 | 76 | 14 | 14 |
| 6 | 1.25 | 250 | 7 | 76 | 14 | 14 |
| 7 | 1.50 | 500 | 8 | 86 | 16 | 12 |
| 8 | 1.50 | 250 | 7 | 84 | -------- | 20 |
| 9 | 1.50 | 200 | 6½ | 82 | -------- | 24 |

The low yield (59%) obtained in Run 3 is due to incomplete reaction. It will be noted that 50 g. of unreacted PSCl$_3$ was recovered.

In the usual practice of our invention, the excess of a lower alkanol used in the first step of the synthesis is recovered from the reaction mixture resulting from said first step and is used in subsequent runs. We prefer to recover this unreacted alcohol in admixture with the halogenated hydrocarbon solvent and, if desired, in admixture with thiophosphoryl compounds which are lower-boiling than the first intermediate by fractional distillation and to use this recovered fraction or fractions as a source of lower alkanol, solvent and unreacted or partially reacted thiophosphoryl compounds in a subsequent operation. By operating in this manner it is necessary, in subsequent runs, to add only approximately one-tenth of a mole of fresh lower alkanol in excess over the one mole theoretically required, in order to have the lower alkanol present in the half-molar excess desired. Furthermore, the yields of PSCl$_2$(OR) obtained in successive runs by using the recovered unreacted lower alkanol, and thiophosphoryl chloride (and partial reaction products thereof) and the recovered solvent are successively higher.

The reaction mixture from the first step of our process is treated in any suitable manner to isolate the PSCl$_2$(OR) contained therein. We prefer to fractionally distill the reaction mixture to recover a first fraction or fractions of materials to be recycled as just described. The PSCl$_2$(OR) may be isolated from the residual mixture by continuing the distillation and recovering it as the next fraction. Preferably the distillation of this intermediate is conducted at a reduced pressure of not over 25 mm. to prevent decomposition.

The thus-isolated PSCl$_2$(OR) is next reacted with an alkali metal alcoholate in solution in a lower alkanol, almost invariably the alkanol from which the alcoholate was formed by reaction with alkali metal, usually sodium. We have found it essential, in order to obtain high yields, to use a temperature of not over 10° C. in this step of the synthesis. The higher the temperature used, the lower the yields obtained. We prefer to use a temperature of not over 0° C. In this step of our process we use the alkali metal alcoholate in an amount substantially stoichiometrically equivalent (i. e., equimolecular) to the amount of the PSCl$_2$(OR) taken. The alkali metal alcoholate is in solution in a relatively large amount of the corresponding lower alkanol. The amount of the lower alkanol employed as the solvent medium in this step preferably ranges from 5 to 15 moles per mole of the PSCl$_2$(OR). The mixture is stirred until reaction is substantially complete, this usually requiring from one to three hours. It is preferable to add the solution of the alkali metal alcoholate in the corresponding alkanol to the PSCl$_2$(OR) gradually over a period of time from one to two hours, the mixture being stirred after addition is complete for an additional period of time until reaction is complete. During the addition and during the subsequent period the temperature is preferably kept at not over 0° C. This converts the PSCl$_2$(OR) to PSCl(OR)(OR$_1$)

The resulting PSCl(OR)(OR$_1$) is not isolated from the resulting reaction mixture but is treated directly with an alkali metal p-nitrophenolate, which is added directly to the reaction mixture in an amount which preferably is approximately stoichiometrically equivalent (i. e., equimolecular) to the amount of PSCl(OR)(OR$_1$) present. The resulting mixture is then heated to boiling, preferably under reflux, for a time sufficient to effect reaction of the alkali metal p-nitrophenolate with the PSCl(OR)(OR$_1$) to form the desired product. The resulting mixture is then treated in a suitable way to recover the product therefrom, conveniently by distilling off the alkanol which where anhydrous alkali metal p-nitrophenolate was employed can be directly used in subsequent operations, adding benzene to the residual mixture, washing out the salt from the resulting mixture with water, and removing the benzene from the washed material by distillation.

Our invention may be employed to produce any compound having the general formula

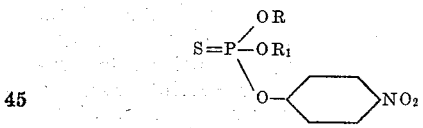

where R and R$_1$ are lower alkyl groups. R and R$_1$ may be any lower alkyl group, having from one to six carbon atoms. R and R$_1$ may be the same or different alkyl groups. R and R$_1$ are determined by the selection of the alkanol used in the first step and of the alkanol from which the alcoholate used in the second step is formed. In some cases a mixture of lower alkanols may be used in the first step. Similarly a mixture of alcoholates of lower alkanols may be used in the second step. Any of the C$_1$ to C$_6$ alkanols may be used in either of the first two steps of our process. Thus we may use methyl, ethyl, propyl, butyl, pentyl or hexyl alcohols or mixtures thereof.

In practicing our invention we prefer to employ anhydrous materials and to carry out the steps of the synthesis under anhydrous conditions. However, we may employ a water-containing alkali metal p-nitrophenolate, such as the commercially available sodium salt of p-nitrophenol which contains about 21–23% of water which corresponds to approximately

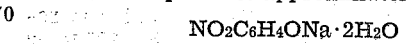

in the last step of the synthesis although such use has the disadvantages that the yield is generally substantially lower (other conditions being the same) and that the alcohol recovered from the process contains the water present in the alkali p-nitrophenolate used and has to be rectified and dried before it can be used again in the process.

The relative amounts of reactants and solvent used in the first step of our process may vary widely. However, we prefer to use the lower alkanol and the thiophosphoryl chloride in such relative proportions that there is present about 1.5 moles, i. e., 1.4 to 1.6 moles, of the lower alkanol per mole of thiophosphoryl chloride present. Less preferably the relative amounts of these two reactants may be outside this figure; for example, the proportion of alkanol may range from 1 to 2.5 moles per mole of thiophosphoryl chloride. While the preferred amount of the halogenated hydrocarbon solvent employed is about 400 cc. per gram molecular weight of thiophosphoryl chloride present, say from 300 to 500 cc. of solvent, it may be outside these limits. Thus it may range from as low as 200 cc. to as high as 1000 cc. per gram molecular weight of thiophosphoryl chloride.

The following examples illustrate our invention in more detail.

EXAMPLE 1

O-ethyl dichlorothiophosphate

To a solution of thiophosphoryl chloride (1017 g., 6 moles) and tertiary butyl chloride (2400 cc.) was added absolute ethanol (414.5 g., 9 moles). The resulting solution, which warmed up to almost boiling, was then heated under reflux for 8 hours. The solvent was distilled off (2150 cc. recovered) and the product fractionally distilled yielding thiophosphoryl chloride (47 g.), $PSCl_2OC_2H_5$, B. P. (11 mm.) = 52° (880 g. or 82%) and residue (88 g.).

The unchanged thiophosphoryl chloride was combined with the recovered solvent, more tertiary butyl chloride was added to make a total of 2400 cc. and this mixture was then heated under reflux for 9 hours with 6 moles thiophosphoryl chloride and 6.6 moles absolute ethanol. The reaction mixture was worked up as above yielding unchanged $PSCl_3$ (31 g.), $PSCl_2OC_2H_5$ (925 g. or 86%) and residue (118 g.).

EXAMPLE 2

O-ethyl dichlorothiophosphate

A one liter 2-neck flask was fitted with a five foot condenser and a gas delivery tube the bottom of which was fritted glass and reaching to the bottom of the flask. The flask was charged with thiophosphoryl chloride (169.5 g., 1 mole), tertiary butyl chloride (400 cc.) and absolute ethanol (69 g., 1.5 moles) and the solution heated under reflux for 8 hours while isobutylene gas was passed in at the rate of about 15 g. per hour. The solvent was distilled off (447 cc.) and the product distilled yielding $PSCl_2OC_2H_5$ (156 g. or 87%) and residue 18 g.

EXAMPLE 3

O-ethyl dichlorothiophosphate

To a solution of chloroform (400 cc.) and $PSCl_3$ (1 mole) was added absolute ethanol (1.5 moles, 69 g.) and the resulting solution heated under reflux for 7 hours. The solvent was removed and the residue distilled yielding 129 g. or 72% of $PSCl_2OC_2H_5$ and residue, 21 g.

EXAMPLE 4

When methylene dichloride was used in place of chloroform in the procedure of Example 3, the yield of O-ethyl dichlorothiophosphate was 76%.

EXAMPLE 5

O-n-Butyl dichlorothiophosphate

To a solution of t-butyl chloride (400 cc.) and $PSCl_3$ (1 mole, 169.5 g.) was added n-butanol (1.5 moles) and the resulting solution heated under reflux for 9 hours. The solvent was distilled off yielding $PSCl_2OBu$, B. P. (13 mm.) = 85°, 165 g. or 80%, residue, 42 g. In a subsequent run using the recovered solvent $PSCl_3$ (1 mole) and n-butanol (1.1 moles), the yield of $PSCl_2OBu$ was 160 g. or 79%.

EXAMPLE 6

O,O-diethyl-O-p-nitrophenylthiophosphate

O-ethyl dichlorothiophosphate (179 g. 1 mole) prepared in the manner described above was placed in a two liter three-neck flask equipped with a thermometer and stirrer. It was stirred and kept below 0° while a solution of sodium metal (23 g.) in commercial absolute ethanol (600 cc.) was added over a period of about one and one-half hours. After stirring for an additional half hour, anhydrous sodium p-nitrophenolate (158 g.) was added and the reaction mixture heated under reflux for 10 minutes. The ethanol was distilled off and reserved. To the residue benzene (500 cc.) was added and the salt washed out with water. Removal of the benzene yielded a dark amber oil (249 g. or 90%) of O,O-diethyl-O-p-nitrophenylthiophosphate.

EXAMPLE 7

O-methyl-O-ethyl-O-p-nitro phenylthiophosphate

To O-ethyl dichlorothiophosphate (268.5 g. 1.5 moles) prepared as described above cooled below 0° is added with stirring a solution of sodium metal (34.5 g.) in methanol (900 cc.) over a period of about one and one-half hours. The temperature is maintained at 0° or below. After stirring for an additional one-half hour, anhydrous sodium p-nitrophenolate (241.5 g. 1.5 moles) is added. The reaction mixture is heated under reflux for 10 minutes and then the methanol distilled off. To the cooled residue benzene (750 cc.) is added and the salt washed out with water. The benzene is removed yielding (380 g. or 90%) or O-methyl-O-ethyl-O-p-nitrophenylthiophosphate as a dark amber oil.

EXAMPLE 8

O,O-dimethyl-O-p-nitrophenylthiophosphate

To O-methyl dichlorothiophosphate (247.5 g. 1.5 moles) prepared in the manner described above cooled below 0° is added with stirring a solution of sodium metal (34.5 g.) in methanol (900 cc.) over a period of about one and one-half hours. The temperature is maintained at 0° or below. After stirring for an additional one-half hour sodium p-nitrophenolate (241.5 g.) is added. The reaction mixture is heated under reflux for 10 minutes and the methanol distilled off. To the cooled residue is added 750 cc. of benzene and the salt washed out with water. Removal of the benzene yields O,O-dimethyl-O-p-nitrophenylthiophosphate as a dark amber oil, yield, 348 g. or 88%.

EXAMPLE 9

*O-methyl-O-n-propyl-O-p-nitrophenyl-thiophosphate*

To O-n-propyl dichlorothiophosphate (290 g. 1.5 moles) prepared in the manner described above cooled below 0° is added with stirring a solution of sodium metal (34.5 g.) in absolute methanol (600 cc.) over a period of about one and one-half hours. The temperature is maintained at 0° or below. After stirring for an additional one-half hour sodium p-nitrophenolate (237 g.) is added. The reaction mixture is heated under reflux for ten minutes and then the methanol is distilled off. To the cooled residue 750 cc. of benzene is added and the salt is washed out with water. Removal of benzene yields O-methyl-O-propyl-O-p-nitrophenylthiophosphate as a dark amber oil, yield 405 g. or 94%.

EXAMPLE 10

*O-methyl-O-butyl-O-p-nitrophenyl-thiophosphate*

To O-butyl dichlorothiophosphate (310 g. 1.5 moles) prepared in the manner described above cooled below 0° is added with stirring a solution of sodium (34.5 g.) in absolute methanol (900 cc.) over a period of about 2 hours. The temperature is maintained at 0° or below. After stirring for an additional one-half hour sodium p-nitrophenolate (241.5 g.) is added. The reaction mixture is heated under reflux for 10 minutes and then the methanol is distilled off. To the cooled residue benzene (750 cc.) is added and the salt washed out with water. Removal of the benzene yields O - methyl - O - butyl - O - p - nitrophenylthiophosphate as a dark amber oil, yield 417 g. or 90%.

EXAMPLE 11

*O-ethyl-O-n-propyl-O-p-nitrophenyl-thiophosphate*

O-n-propyl dichlorothiophosphate (PSCl₂OPr) (290 g., 1.5 moles) prepared in the manner described above is stirred and cooled below 0°. To this is added a solution of sodium (34.5 g.) in absolute ethanol (900 cc.) over a period of about 1.5 hours. The temperature of the reaction mixture is maintained at 0° or below by cooling. After stirring for an additional one-half hour at 0°, to the reaction mixture anhydrous sodium p-nitrophenolate (240 g.) is added. The cooling bath is removed and the reaction mixture is heated under reflux for about 15 minutes. Then the ethanol is distilled off. To the residue benzene (750 cc.) is added and the salt is washed out with water. The benzene is removed leaving an amber oil, yield, 399 g. or 90%.

EXAMPLE 12

*O,O-diethyl-O-p-nitrophenylthiophosphate*

O-ethyl dichlorothiophosphate (269 g., 1.5 moles) made as described above is placed in a two liter, three-necked flask equipped with a thermometer, condenser, and mechanical stirrer. It is stirred and while holding the temperature below 0° C., a solution of metallic sodium (36.2 g., 5% excess) dissolved in commercial absolute ethanol (900 cc.) is added slowly over a period of about two hours. After stirring an additional half hour, the cooling bath is removed and 300 g. of commercially available hydrated sodium p-nitrophenolate (21-23% moisture content) is added and the stirred reaction mixture heated to boiling and refluxed about 30 minutes. When the hydrated sodium p-nitrophenolate is first added the color is a canary-yellow and after the 30-minute refluxing it is a tan or fawn color. The ethanol is removed by distillation and reserved. To the residue benzene (750 cc.) is added and the soluble sodium salts washed out with water. Removal of the benzene yields a dark amber oil (397.5 g. or 90%) of O,O,diethyl-O-p-nitrophenylthiophosphate.

From the foregoing description it will be seen that we have invented a process of making O-alkyl dichlorothiophosphates and O-alkyl-O-alkyl-O - p - nitrophenylthiophosphates which offers many advantages over prior methods of making compounds of this type. The process of our invention is distinguished by its effectiveness and particularly by the high yields which are obtainable in accordance therewith. The process makes possible the ready recovery and re-use of the halogenated hydrocarbon solvent used in the first step and of the lower alkanols used in the process. The process described herein has advantages over a similar process wherein benzene is used in the first step in that a higher yield of the desired product is produced, less alcohol is required for best results and the process has a higher productivity because of the use of less solvent and less alcohol. The process wherein tertiary butyl chloride is used as a solvent in the first step and wherein isobutylene is introduced during this first step is very advantageous since the hydrogen chloride formed by the first step is immediately removed from the reaction mixture and converted into additional solvent. Still another advantage of our process is that the alcohol which was added as a carrying and reaction medium for the reaction between the PSCl₂(OR) and the alkali metal alcoholate is readily recovered in anhydrous form ready for immediate re-use where anhydrous alkali metal p-nitrophenolate is employed. Numerous other advantages of our invention will be apparent to those skilled in the art.

Having thus described our invention, what we claim and desire to protect by Letters Patent is:

1. A process of making a compound having the general formula

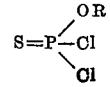

where R is a lower alkyl group which comprises refluxing an anhydrous mixture of thiophosphoryl chloride, a lower alkanol and tertiary butyl chloride as solvent, the relative proportions ranging from 1 to 2.5 moles of said lower alkanol per mole of said thiophosphoryl chloride and from 200 to 1000 cubic centimeters of said tertiary butyl chloride per gram molecular weight of said thiophosphoryl chloride.

2. A process of making a compound having the general formula

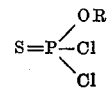

where R is a lower alkyl group which comprises refluxing an anhydrous mixture of thiophosphoryl chloride, a lower alkanol and tertiary butyl chloride as solvent in the presence of isobutylene in amount at least sufficient to combine with the hydrogen chloride liberated by the reaction.

3. A process of making a compound having the general formula

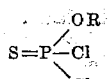

where R is a lower alkyl group which comprises refluxing an anhydrous mixture of thiophosphoryl chloride, a lower alkanol and tertiary butyl chloride as solvent, and introducing isobutylene into said mixture during said refluxing at a rate such that isobutylene is present at all times in amount at least sufficient to combine with the hydrogen chloride liberated by the reaction.

4. A process of making a compound having the general formula

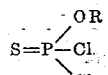

where R is a lower alkyl group which comprises refluxing an anhydrous mixture of thiophosphoryl chloride, a lower alkanol and tertiary butyl chloride as solvent, the relative proportions ranging from 1.4 to 1.6 moles of said lower alkanol per mole of said thiophosphoryl chloride and from 300 to 500 cubic centimeters of said tertiary butyl chloride per gram molecular weight of said thiophosphoryl chloride.

RICHARD H. F. MANSKE.
MARSHALL KULKA.

REFERENCES CITED

The following references are of record in the file of this patent:

UNITED STATES PATENTS

| Number | Name | Date |
|---|---|---|
| 1,844,408 | Nicolai | Feb. 9, 1932 |
| 1,945,183 | Clemmensen | Jan. 30, 1934 |
| 2,005,619 | Graves | June 18, 1935 |
| 2,309,829 | Davis et al. | Feb. 2, 1943 |
| 2,471,464 | Toy | May 31, 1949 |
| 2,520,393 | Fletcher | Aug. 29, 1950 |

OTHER REFERENCES

Mastin et al., "Jour. Am. Chem. Soc.," vol. 67 (1945), pp. 1662 to 1664.

Fletcher et al., "Jour. Am. Chem. Soc.," vol. 70 (1948), pp. 3943–44.

Thurston, FIAT Report No. 949, "Organic Chemical Intermediates for Insecticides, Fungicides, and Rodenticides," dated October 14, 1946, released May 30, 1947. O. T. S. No. PB–60890, pages 19, 20.